(12) United States Patent
Lutz et al.

(10) Patent No.: US 9,590,918 B2
(45) Date of Patent: Mar. 7, 2017

(54) TOPOLOGY- AND LOAD-AWARE (TLA) RESOURCE ALLOCATION FOR A MEDIUM ACCESS CONTROL (MAC) PROTOCOL

(71) Applicants: Jonathan Lutz, Chandler, AZ (US); Charles Colbourn, Phoenix, AZ (US); Violet Syrotiuk, Phoenix, AZ (US)

(72) Inventors: Jonathan Lutz, Chandler, AZ (US); Charles Colbourn, Phoenix, AZ (US); Violet Syrotiuk, Phoenix, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/064,763

(22) Filed: Mar. 9, 2016

(65) Prior Publication Data

US 2016/0191417 A1    Jun. 30, 2016

Related U.S. Application Data

(63) Continuation of application No. PCT/US2014/054509, filed on Sep. 8, 2014.

(60) Provisional application No. 61/875,428, filed on Sep. 9, 2013.

(51) Int. Cl.
*H04W 4/00* (2009.01)
*H04L 12/911* (2013.01)
*H04W 72/04* (2009.01)
*H04W 74/08* (2009.01)

(52) U.S. Cl.
CPC ....... *H04L 47/829* (2013.01); *H04W 72/0446* (2013.01); *H04W 72/0486* (2013.01); *H04W 74/08* (2013.01)

(58) Field of Classification Search
CPC combination set(s) only.
See application file for complete search history.

(56) References Cited

U.S. PATENT DOCUMENTS

| | | | |
|---|---|---|---|
| 6,594,234 B1 | 7/2003 | Chard et al. | 370/236 |
| 6,894,991 B2 | 5/2005 | Ayyagari et al. | 370/325 |
| 7,388,838 B2 | 6/2008 | Abraham et al. | 370/235 |
| 7,715,341 B2 | 5/2010 | Chheda et al. | 370/328 |
| 7,778,151 B2 | 8/2010 | Bertrand et al. | 370/208 |

(Continued)

FOREIGN PATENT DOCUMENTS

KR    10-1159944    6/2012

OTHER PUBLICATIONS

Lutz et al, Variable Weight Sequence for Adaptive Scheduled Access in MANETS, Springer, pp. 53-64, Jun. 2012.*

(Continued)

*Primary Examiner* — Frank Duong
(74) *Attorney, Agent, or Firm* — Norton Rose Fulbright US LLP

(57) ABSTRACT

A medium access control (MAC) protocol may be used to facilitate communication between nodes in a network. A protocol for allocating network resources between a set of nodes with demands may be an adaptive topology- and load-aware (TLA) allocation protocol. The allocation protocol may be executed by a bidder algorithm and an auctioneer algorithm on each node of the network. Claims and offers may be generated at each node and transmitted to other nodes on the network. The claims and offers may be updated as load and topology of the network change.

24 Claims, 3 Drawing Sheets

(56) References Cited

U.S. PATENT DOCUMENTS

| | | | |
|---|---|---|---|
| 8,036,135 B2 | 10/2011 | Stamoulis | 370/252 |
| 8,095,141 B2 | 1/2012 | Teague | 455/452.1 |
| 8,130,654 B2 | 3/2012 | Garcia-Luna-Aceves et al. | 370/236 |
| 8,189,526 B2 | 5/2012 | Hsu et al. | 370/329 |
| 8,223,728 B2 | 7/2012 | Westphal et al. | 370/338 |
| 8,284,738 B2 | 10/2012 | Ghanadan et al. | 370/336 |
| 8,401,021 B2 | 3/2013 | Buga et al. | 370/395.42 |
| 8,442,023 B2 | 5/2013 | Ghanadan et al. | |
| 2002/0080748 A1 | 6/2002 | Dick | 370/336 |
| 2008/0080472 A1 | 4/2008 | Bertrand et al. | 370/344 |
| 2010/0105405 A1 | 4/2010 | Vujcic | 455/452.1 |

OTHER PUBLICATIONS

Lutz et al, ATLAS: Adaptive Topology- and Load-Aware Scheduling, IEEE, 14 pages, Nov. 2013.*

Bharghavan et al., "MACAW: A medium access protocol for wireless LANs." In *Proceedings of the ACM Conference on Communications Architectures, Protocols and Applications (SIGCOMM'94)*, pp. 212-225, London, UK, 1994.

Chlamtac et al. "Making transmission schedules immune to topology changes in multi-hop packet radio networks", *IEEE/ACM Transactions on Networking*, 2(1):23-29, Feb. 1994.

Chlamtac et al., "A spatial-reuse TDMA/FDMA for mobile multi-hop radio networks", In *Proceedings of the Fourth Annual Joint Conference of the IEEE Computer and Communications Societies (Infocom '85)*, pp. 389-393, 1985.

Chlamtac et al., "On Broadcasting in Radio Networks—Problem Analysis and Protocol Design" *IEEE Transactions on Communications*, COM-33(12): 1240-46, 1985.

Chlamtac et al., "Tree-Based Broadcasting in Multihop Radio Networks" *IEEE Transactions on Computers*, C-36(10): 1209-1223, 1987.

Chlamtac et al., "Distributed nodes organization algorithm for channel access in a multihop dynamic radio network", *IEEE Transactions on Computers*, C-36(6):728-737, Jun. 1987.

Colbourn et al., "Cover-free families and topology-transparent scheduling for MANETs", *Designs, Codes and Cryptography*, 32:65-95, 2004.

Colbourn et al., "Scheduled persistence for medium access control in sensor networks", In *Proceedings of the 1st IEEE International Conference on Mobile Ad-hoc and Sensor Systems (MASS '04)*, pp. 264-273, Fort Lauderdale, Florida, U.S.A., Oct. 2004.

Colbourn et al., "Steiner systems for topology-transparent access control in MANETs", In *Proceedings of the Second International Conference on Ad Hoc Networks and Wireless (AdHoc Now '03)*, vol. LNCS 2865, pp. 247-258, Berlin/Heidelberg, Germany, 2003. Springer-Verlag.

Deng et al., "A new backoff algorithm for the IEEE 802.11 distributed coordination function." In *Proceedings of Communication Networks and Distributed Systems Modeling and Simulations (CNDS'04)*, Jan. 2004.

D'Yachkov et al., "Superimposed distance codes", *Problems Control and Information Theory*, 18(4): 237-250, 1989.

Fullmer et al., "Floor acquisition multiple access (FAMA) for packetradio networks", In *Proceedings of the Conference on Applications, Technologies, Architectures, and Protocols for Computer Communication, (SIGCOMM'95)*, vol. 25, pp. 262-273, Cambridge, Massachusetts, USA, 1995.

Galluccio et al., "Guest editorial for special issue on cross-layer design in ad hoc and sensor networks", *Ad Hoc Networks*, 11:611-613, 2013.

Garcia-Luna-Aceves et al., "Receiver-initiated collision avoidance in wireless networks", *Wireless Networks*, 8:249-263, 2002.

Haas et al., "On optimizing the backoff interval for random access schemes", *IEEE Transactions on Communications*, 51(12):2081-2090, Dec. 2003.

Hastad et al., "Analysis of backoff protocols for multiple access channels", In *Proceedings of the 19th annual ACM Symposium on Theory of Computing (STOC'87)*, pp. 740-744, New York, New York, USA, May 1987.

IEEE. *IEEE 802.3, CSMA/CD Ethernet access method*, 1983.

IEEE. *IEEE 802.11, Wireless LAN medium access control (MAC) and physical layer (PHY) specifications*, 1997.

Jacobson et al., "TCP extensions for high performance", RFC 1323 (Standard), May 1992.

Jiang et al., "General constructions of optimal variable-weight optical orthogonal codes", *IEEE Transactions on Information Theory*, 57(7):4488-4496, 2011.

Ju et al., "An optimal topology-transparent scheduling method in multihop packet radio networks", *IEEE/ACM Transactions on Networking*, 6(3):298-305, Jun. 1998.

Ju et al., "TDMA scheduling design of multihop packet radio networksbased on latin squares", *IEEE Journal on Selected Areas in Communications*, 17(8):1345-1352, Aug. 1999.

Karn, "MACA—A new channel access method for packet radio", In *Proceedings from the ARRL/CRRL Amateur Radio 9th Computer Networking Conference*, pp. 134-140, 1990.

Koutsonikolas et al., "On TCP throughput and window size in a multihop wireless network testbed", In *Proceedings of the Second ACM Workshop on Wireless Network Testbeds, Experimental Evaluation and Characterization (WINTECH'07)*, pp. 51-58, Montreal, Quebec, 2007.

Lutz et al., "ATLAS: Adaptive Topology- and Load-Aware Scheduling" Adaptive topological persistence, In preparation (not yet published), Submitted to IEEE Transaction on Mobile Computing, 2013.

Lutz et al., "Apples and oranges: Comparing schedule- and contentionbased medium access control", In *Proceedings of the 13th ACM International Conference on Modeling, Analysis and Simulation of Wireless and Mobile Systems (MSWiM'10)*, pp. 319-326, Bodrum, Turkey, Oct. 2010.

Lutz et al., "Topological persistence for medium access control", *IEEE Transactions on Mobile Computing*, 99(PrePrints), 2012.

Lutz et al., "Variable weight sequences for adaptive channel access in MANETs", In *Proceedings of Sequences and their Applications (SETA '12), Lecture Notes in Computer Science 7280*, pp. 53-64, Waterloo, Ontario, Canada, 2012.

McKeown et al., "OpenFlow: enabling innovation in campus networks", *ACM SIGCOMM Computer Communication Review*, 38(2):69-74, Apr. 2008.

Navidi et al., "Stationary Distributions for the Random Waypoint Mobility Model", *IEEE Transactions on Mobile Computing*, 3(1): 99-108,2004.

Navidi et al., "Improving the Accuracy of Random Waypoint Simulations Through Steady-State Initialization*" Technical Report MCS-03-08, *The Colorado School of Mines*, Jun. 2003.

The Network Simulator ns-2. http://www.isi.edu/nsnam/ns/. Accessed on Feb. 2, 2016.

Obeidat et al., "Cross-layer opportunistic adaptation for voice over ad hoc networks", *Computer Networks*, 56(2):762-779, Feb. 2012.

OpenFlow—enabling innovation in campus networks, 2008, http://openflow.org.

OpenFlow switch specification, version 1.1.0 implemented. http://openflow.org, Feb. 2011.

Rentel et al., "Reed-Solomon and Hermitian code-based scheduling protocols for wireless ad hoc networks", In *Proceedings of the Fourth International Conference on Ad Hoc Networks and Wireless (AdHoc Now '05), LNCS 2865*, pp. 221-234, 2005.

Rozovsky et al., "SEEDEX: A MAC protocol for ad hoc networks", In *Proceedings of the 2nd ACM International Symposium on Mobile Ad Hoc Networking and Computing (MobiHoc'01)*, pp. 67-75, Long Beach, California, USA, Oct. 2001.

Shaukat et al., "Adapative overhead reduction via MEWMA control charts", In *Proceedings of the 14th ACM International Conference on Modeling, Analysis and Simulation of Wireless and Mobile Systems(MSWiM'11)*, 2011.

Shaukat et al., "Using local conditions to reduce control overhead", *Ad Hoc Networks*, 11: 1782-95, 2013.

(56) References Cited

OTHER PUBLICATIONS

Shaukat et al., "Using monitoring to control a proactive routing protocol", *Ad Hoc and Sensor Wireless Networks, An International Journal*, 6((3-4)):299-319, 2008.
Shaukat et al., "Locally proactive routing protocols", In *Proceedings of the 9th International Conference on Ad Hoc Networks and Wireless (AdHoc Now '10)*, pp. 68-80, 2010.
Sherwood et al., "FlowVisor: A network virtualization layer", Technical Report OPENFLOW-TR-2009-1, Deutsche Telekom Inc., R&E Lab, Oct. 2009.
Sobrinho et al., "Distributed multiple access procedures to provide voice communications over IEEE 802.11 wireless networks", In *Proceedings of the Global Telecommunications Conference, (GlobeCom '96)*, vol. 3, pp. 1689-1694, London, UK, Nov. 1996.
Srivastava et al., "Cross-layer design and optimization in wireless networks", In Q. H. Mahmoud, editor, *Cognitive Networks: Towards Self-Aware Networks*, chapter 6, pp. 121-146. John Wiley & Sons, Ltd., 2007.
Syrotiuk, "Medium access control (MAC) protocols for wireless networks", In A. Boukerche, editor, *Handbook of Algorithms for Wireless Networking and Mobile Computing*, chapter 3, pp. 23-44. Chapman & Hall/CRC, Computer and Information Science Series, 2006.
Syrotiuk et al., "Modeling cross layer interaction using inverse optimization", In S. Basagni, M. Conti, S. Giordano, and I. Stojmenovic, editors, *Ad Hoc Networking*, chapter 15, pp. 411-426. John Wiley & Sons, 2004.
Syrotiuk et al., "Topology-transparent scheduling in manets using orthogonal arrays", In *Proceedings of the DIAL-M/POMC Joint Workshop on Foundations of Mobile Computing*, pp. 43-49, San Diego, California, USA, Sep. 2003. ACM.
Syrotiuk et al., "Rateless forward error correction for topologytransparent scheduling", *IEEE/ACM Transactions on Networking*, 16(2):464-472, 2008.
Talucci et al., "MACA-BI (MACA by invitation)—a receiver oriented access protocol for wireless multihop networks", In *Proceedings of the IEEE 6th International Conference on Universal Personal Communications Record*, vol. 2, pp. 435-439, 1997.
Tang et al., "A protocol for topology-dependent transmission scheduling in wireless networks", In *Proceedings of the IEEE Wireless Communications and Networking Conference, (WCNC'99)*, pp. 1333-1337, 1999.
Vadde et al., "Factor interaction on service delivery in mobile ad hoc networks", *IEEE Journal on Selected Areas in Communications (JSAC)*, 22(7):1335-1346, Sep. 2004.
Vadde et al., "The impact of QoS-aware MAC protocols in classic and QoS MANET architectures", In *Proceedings of the SCS International Symposium on Performance Evaluation of Computer and Telecommunication Systems (SPECTS'04)*, pp. 561-568, Jul. 2004.
Vadde et al., "On timers of routing protocols in mobile ad hoc networks", In *Proceedings of the 3rd International Conference on Ad Hoc Networks and Wireless (AdHoc Now '04)*, pp. 330-335, Vancouver, B.C., Canada, Jul. 2004.
Vadde et al., "Quantifying factors impacting quality-of-service in mobile ad hoc networks", *Simulation*, 81(8):547-560, Aug. 2005.
Vadde et al., "Optimizing protocol interaction using response surface methodology", *IEEE Transactions on Mobile Computing*, 5(6):627-639, Jun. 2006.
Wu et al., "New optimal variable-weight optical orthogonal codes", In *proceedings of Sequences and their Applications (SETA '10)*, pp. 102-112, 2010.
Xu et al., "TCP behavior across multihop wireless networks and the wired internet", In *Proceedings of the ACM Workshop on Mobile Multimedia (WoWMoM'02)*, pp. 41-48, Atlanta, GA, 2002.
Zhao et al., "Constructions of optimal variable-weight optical orthogonal codes", *Journal of Combinatorial Designs*, 18:274-291, 2010.
Zhu et al., "A five-phase reservation protocol (FPRP) for mobile ad hoc networks", *Wireless Networks*, 7(4):371-384, 2001.
Abramson, "The ALOHA System—Another alternative for computer communications*" *Proceedings of the Fall Joint Computer Conference*, pp. 281-285, 1970.
Freeman, "A set of Measures of Centrality Based on Betweenness" *Sociometry*, 40(1): 35-41, 1977.
Gerla et al., "TCP over Wireless Multi-hop Protocols. Simulation and Experiments", *Proceedings of the 1999 IEEE International Conference on Communication (ICC' 99)*, pp. 1089-1094, 1999.
Kawadia et al., "Experimental Investigations into TCP Performance over Wireless Multihop Networks*" *Proceedings of the 2005 ACM SIGCOMM workshop on Experimental approaches to wireless network design and analysis (E-WIND '05)*, pp. 29-34, 2005.
Leung et al., "Transmission control protocol (TCP) in wireless networks: Issues, approaches, and challenges." *IEEE Communications Surveys & Tutorials*, 8:64-79, 2006.
Tian et al., "TCP in wireless environments: Problems and solutions", *IEEE Communications Magazine*, 43: 27-32, 2005.
International Search Report and Written Opinion issued in PCT/US2014/054509, mailed on Dec. 17, 2014.

* cited by examiner

TOPOLOGY- AND LOAD-AWARE (TLA) RESOURCE ALLOCATION FOR A MEDIUM ACCESS CONTROL (MAC) PROTOCOL

CROSS-REFERENCE TO RELATED APPLICATIONS

This application is a continuation of International Application No. PCT/US2014/054509 filed Sep. 8, 2014, which claims the benefit of priority of U.S. Provisional Patent Application No. 61/875,428 filed on Sep. 9, 2013, entitled "A SCHEDULED MEDIUM ACCESS CONTROL (MAC) PROTOCOL FOR MOBILE WIRELESS NETWORKS." The entire contents of each of the above-referenced disclosures is specifically incorporated by reference herein without disclaimer.

FIELD OF THE DISCLOSURE

This disclosure relates to wireless networks. More particularly, this disclosure relates to medium access control for wireless networks.

BACKGROUND

Wireless networks implement protocols for medium access control (MAC). These MAC protocols handle, for example, contention between multiple devices requesting access to the network medium. For example, when two computers are connected to the same wireless network on a single channel and in transmission range of each other, generally only one computer can communicate at a time on the channel. A MAC protocol operates on both of the computers to determine when the computer can transmit data on the wireless network. When both computers attempt to transmit at the same time, their data is lost and the MAC protocol determines how to handle the contentious transmission.

Conventionally, the IEEE 802.11 standard has been used as a MAC protocol on computers. The IEEE 802.11 standard is a contention-based MAC protocol, such that no fixed assignments of time on the network are generally assigned to computers. However, contention-based MAC protocols such as IEEE 802.11 suffer from probabilistic delay guarantees, severe short-term unfairness, and poor performance at high loads. One reason for selecting such a contention-based MAC protocol, despite poor performance, is the ability of the MAC protocol to adapt to changing topology in the wireless network.

One conventional solution for implementing scheduling algorithms in networks with changing load and topology is to alternate a contention phase with a scheduled phase in a hybrid solution. In the contention phase, nodes exchange topology information used to compute a conflict-free schedule that is followed in the subsequent scheduled phase. However, changes in topology and load do not always align with the phases of the algorithm resulting in a schedule that often lags behind the network state.

BRIEF SUMMARY

A topology- and load-aware (TLA) scheduling protocol is described below that provides an adaptable scheduled communication protocol for medium access control (MAC). The protocol may be implemented in MAC protocols on devices, such as computers, cellular phones, tablet computers, gaming devices, and the like. The protocol may be implemented through a distributed auction of auctioneers and bidders to allocate available resources in the network. Each network interface of the devices may be considered a node. When assigning resources by the protocol, the protocol may compute a node's persistence, the fraction of time the node is permitted to transmit, explicitly to track the current topology and load through an adaptive topology and load-aware (TLA) scheduling protocol. Each node's schedule, achieving a persistence informed by its allocation, is updated whenever a change in topology or load results in a change in allocation. The TLA protocol may be integrated into MAC protocols, including both schedule-based protocols and contention-based protocols. In one embodiment, the TLA protocol described may be incorporated with the IEEE 802.11 standard.

The TLA protocol and system implementing the TLA protocol described below may provide high throughput, low delay, and reduced delay variance. The protocol achieves these qualities through a continuous computation of the TLA allocation and updating of the schedule on-the-fly. By not requiring phases of execution, the TLA protocol may eliminate or reduce the complexity of, and lag inherent in, topology-dependent approaches. In one embodiment when updates are not forced to be frame synchronized, the disclosed TLA protocol may allow continuous adaptation.

According to one embodiment, a method may include identifying a set of network resources, identifying a set of demands, and assigning resources of the set of network resources to demands of the set of demands, wherein the step of assigning comprises incrementally assigning network resources to the demands based on a desired persistence of each demand of the set of demands.

According to another embodiment, a computer program product including a non-transitory computer-readable medium may include code to execute the steps of identifying a set of network resources, identifying a set of demands, and assigning resources of the set of network resources to demands of the set of demands, wherein the step of assigning comprises incrementally assigning network resources to the demands based on a desired persistence of each demand of the set of demands.

According to a further embodiment, an apparatus includes a memory and a processor coupled to the memory, in which the processor may be configured to perform the steps of identifying a set of network resources, identifying a set of demands, assigning resources of the set of network resources to demands of the set of demands, wherein the step of assigning comprises incrementally assigning network resources to the demands based on a desired persistence of each demand of the set of demands.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments.

DETAILED DESCRIPTION

In contention-based schemes, such as IEEE 802.11, a node may compute implicitly when to access a channel, basing its decisions on perceived channel contention. Instead, a node's persistence may be calculated explicitly in a way that tracks the current topology and load. The persistence may be, for example, the fraction of time a node is permitted to transmit. One method of calculated the persistence is through an adaptive topology- and load-aware scheduling protocol. In one embodiment, channel allocation in a wireless network may be considered as a resource allocation problem where the demands correspond to transmitters, and the resources to receivers.

Resource allocation in a persistence-based allocation scheme may be computed through a distributed auction that continuously executes on at least some of the nodes of the network. In one embodiment, the resource allocation piggybacks offers and claims onto existing network traffic to compute a lexicographic maximum-minimum allocation to transmitters. Each node's random schedule, achieving a persistence informed by its allocation, may be updated at the start of every frame and whenever a change in topology or load results in a change in allocation. In one embodiment, slots of the schedule may be grouped into frames to reduce the variance in delay, such that there is no need to wait for a frame boundary to update the schedule. Even though the random schedules may not be conflict-free, the disclosed allocation scheme may not be contention-based when the scheme does not select persistences or make scheduling decisions based on perceived channel contention. Rather, the allocation scheme may make decisions based, at least in part, on topology and/or load.

In one embodiment, one or more nodes may perform continuous computation of a topology- and load-aware (TLA) allocation protocol and update the schedule in real-time or near real-time, such that updates may only occur where and when needed. By not requiring phases of execution and by computing persistences rather than conflict-free schedules, the algorithms disclosed below may eliminate the complexity of, and lag inherent in, topology-dependent approaches. The TLA allocation protocol may be incorporated into a protocol stack.

Figure 1:
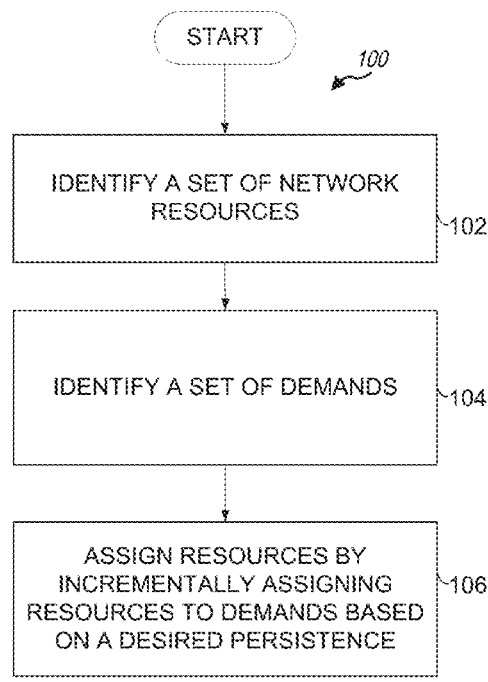
FIG. 1 is a flow chart illustrating a method of assigning network resources in a topology- and load-adaptive (TLA) protocol according to one embodiment of the disclosure.

One method of operation for a TLA allocation protocol is described in FIG. 1. FIG. 1 is a flow chart illustrating a method of assigning network resources in a topology- and load-adaptive (TLA) protocol according to one embodiment of the disclosure. A method 100 begins at block 102 with identifying a set of network resources and at block 104 with identifying a set of demands, such as transmitters. Each demand may be a node capable of accessing the network resources, such as time slots in a time division multiplex (TDM) network. For example, each node may be a computer with a transmitter for accessing the wireless TDM network. When the transmitters are coordinated in a TDM network, assigned schedules for the transmitters may include assignments of more than one transmitter to a single slot in a frame. That is, the TDM network may be implemented with conflicting schedules. In one embodiment, each transmitter may be assigned as many slots in the TDM network as needed to achieve the persistence requested by the transmitter, to the extent sufficient slots are available. At block 106, resources are assigned to the demand based on a desired persistence for the demand. The assignment step may be repeated by each demand in the set of demands. Although TDM networks are described, other network types, such as frequency division multiple access (FDMA) networks or code division multiple access (CDMA) networks may implement the disclosed topology- and load-adaptive (TLA) protocol.

The assignment process may include creating a set of nodes from the set of demands, creating a set of active nodes from the set of demands, and incrementally increasing a capacity of the set of network resources assigned to nodes of the set of active nodes. Nodes may be removed from the set of active nodes when either a demand reaches a desired persistence or a demand is bottlenecked by a lack of available resources in the set of network resources. The set of active nodes may be repopulated with nodes when conditions on the network change that may cause reassignment of network resources.

A set of active nodes may be initialized as the set of all nodes. The network resources may be incremented for each active node. After each incremental increase in resources assigned to a node, the node may be removed from the active set of nodes under certain conditions until all of the nodes have been removed from set of active nodes.

Figure 2:
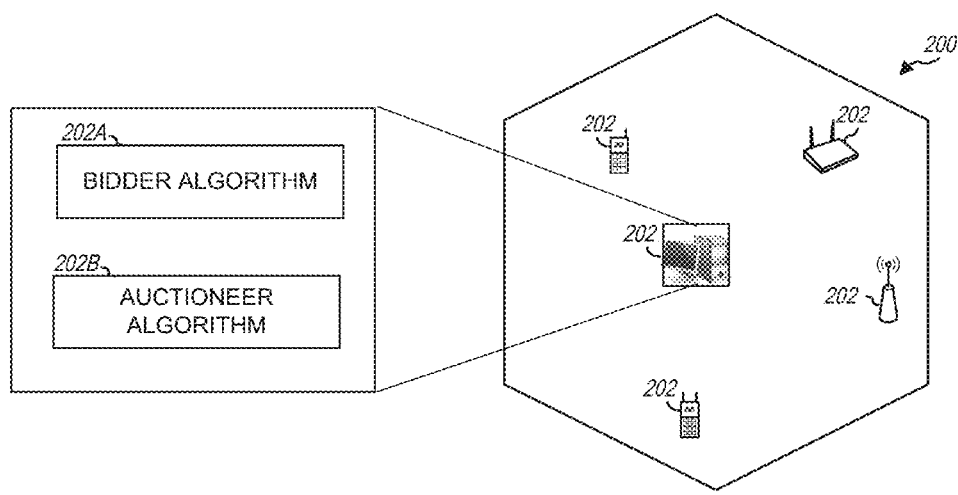
FIG. 2 is block diagram illustrating a network operating under a topology- and load-adaptive (TLA) protocol for assigning network resources according to one embodiment of the disclosure.

In one embodiment, network resources are assigned to demands through claims and offers created by a bidding algorithm and an auctioneer algorithm, respectively, executing on each node of a wireless network. The claims and offers may be piggybacked on data transmissions by inserting the claims and offers in a MAC layer (or layer 2) header attached a data payload. FIG. 2 is block diagram illustrating a network operating under a topology- and load-adaptive protocol for assigning network resources according to one embodiment of the disclosure. A network 200 may include nodes 202, such as a computer, a cell phone, an access point, or a relay. Each node 202 may execute a bidder algorithm 202A and an auctioneer algorithm 202B. Details regarding the algorithms 202A and 202B are provided below. The bidder algorithm 202A may generate a bid, and the auctioneer algorithm 202B may generate an offer. The claim and the offer may be generated at one node and transmitted to neighboring nodes within the network 200. The claim and the offer may be updated when the topology of the network 200 changes or the demand of one of the nodes 202 changes. Both the claim and offer may be updated based on changes in network topology or traffic loads.

One example of a bidder algorithm 202A is shown in the pseudo-code below:

```
upon initialization
    Ri ← ∅
    w_i ← 0
    UPDATECLAIM ( )
end upon
upon receiving a new demand magnitude w_i
    UPDATECLAIM ( )
end upon
upon receiving offer from auctioneer j.
    offers[j] ← offer // Remember the offer of auctioneer j.
    UPDATECLAIM ( )
end upon
upon bidder i joining auction j
    R_i ← R_i ∪ j // Resource j is no longer required by demand i.
    UPDATECLAIM ( )
end upon
upon bidder i leaving auction j
    R_i ← R_i \j // Resource j is no longer required by demand i.
    UPDATECLAIM ( )
end upon
procedure UPDATECLAIM ( )
    // Select the claim to be no larger than the smallest offer or w_i.
    claim ← min ({offers[j] : j ∈ R_i}, w_i)
    send claim to all auctions in R_i
end procedure
```

One example of an auctioneer algorithm 202B is shown in the pseudo-code below:

```
upon initialization
    D_j ← ∅
    c_j ← 0
    UPDATEOFFER ( )
end upon
upon receiving a new capacity of c_j
    UPDATEOFFER ( )
end upon
upon receiving claim from bidder i
    claims[i] ← claim // Remember the claim of bidder i.
    UPDATEOFFER ( )
end upon
upon bidder i joining auction j
    D_j ← D_j ∪ i // Demand i now requires resource j.
    UPDATEOFFER ( )
end upon
upon bidder i leaving auction j
    D_j ← D_j \ i // Demand i no longer requires resource j.
    UPDATEOFFER ( )
end upon
procedure UPDATEOFFER ( )
    D*_j ← ∅
    A_j ← cj
    done ← False
    while (done = False) do
        // If D*_j contains all bidders in D_j, then auction j does not
        // constrain an of the bidders in D_j.
        if (D*_j = D_j) then
            done ← True
            offer ← A_j + max ({claims[i] : i ∈ D_j})
        // Otherwise, auction j constrains at least one bidder in D_j.
        else
            done ← True
            // What remains available is offered in equal portions to
            // the bidders constrained by auction j.
            offer ← A_j/|D_j\D*_j|
            // Construct D*_j and compute A_j for the new offer.
            for all b ∈ {D_j \ D*_j} do
                if ( claims[b] < offer ) then
                    D*_j ← D*_j ∪ b
                    A_j ← A_j - claims[b]
                    done ← False
    send offer to all bidders in D_j
end procedure
```

The algorithms executed by the auctioneer 202B and the bidder 202A may respond to externally triggered events and may take action, in response to these events, to adjust allocations and/or schedules for transmitters in the network.

Figure 3:
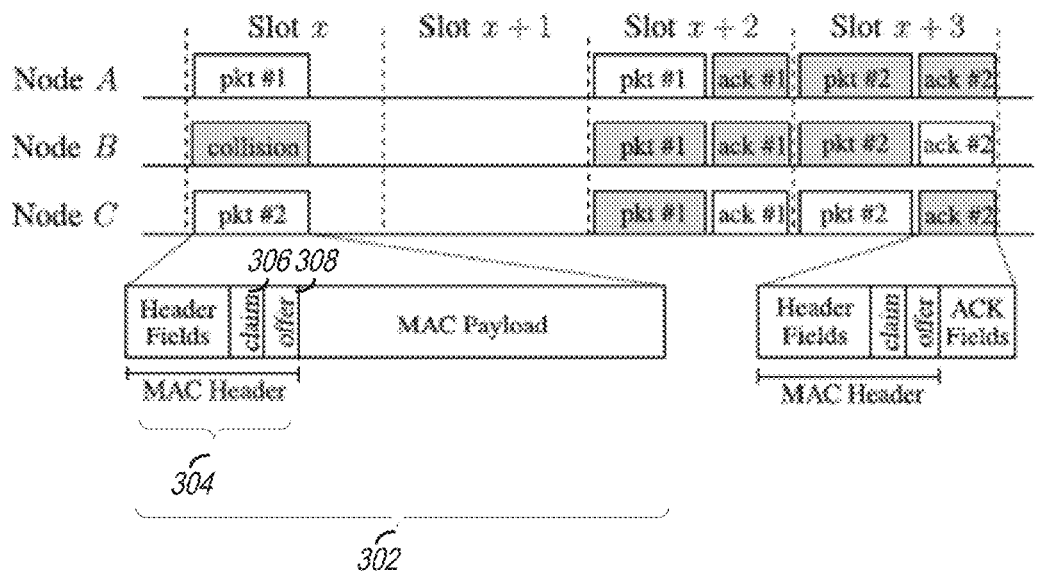
FIG. 3 is a block diagram illustrating a network transmission with a piggybacked claim and offer according to one embodiment of the disclosure.

The allocation algorithms 202A and 202B described above may be incorporated into a MAC-layer protocol. In the MAC protocol, each network node may execute a bidder and auctioneer algorithm, such as those described above. Auctioneers and bidders may discover each other as they receive communications from one another and rely on the host node to detect lost adjacencies. Offers and claims may be encoded using eight bits each and may be embedded within the MAC header of all transmissions to be piggybacked on existing network traffic. One example of such piggybacked communications is shown in FIG. 3. FIG. 3 is a block diagram illustrating a network transmission with a piggybacked claim and offer according to one embodiment of the disclosure. A packet 302 transmitted by a node, such as node C, may include a MAC header 304 generated by the MAC-layer protocol stack and a payload carrying data from a higher level. The MAC header 304 may include a claim 306 and/or an offer 308 generated by the auctioneer algorithm 202B of FIG. 2 and/or the bidder algorithm 202A of FIG. 2. Node C's offer and claim shown in FIG. 3 may eventually be received by all single-hop neighbors, such that the bidder algorithm and auctioneer algorithm of other nodes receive that information. According to one embodiment, the claim 306 and offer 308 may be transmitted in an overhead of four bytes per packet, such that a total overhead may be as small as 0.36 percent.

In the communications scheme shown in FIG. 3, packets may be acknowledged within the slot they are transmitted and the slots sized accordingly. Unacknowledged MAC packets may be retransmitted up to ten times before they are dropped by the sender. FIG. 3 also illustrates collisions that may occur. For example, transmissions collide in slot x between pkt #1 and pkt #2, and these packets may then be repeated successfully in slots x+2 and x+3, respectively.

Figure 4:
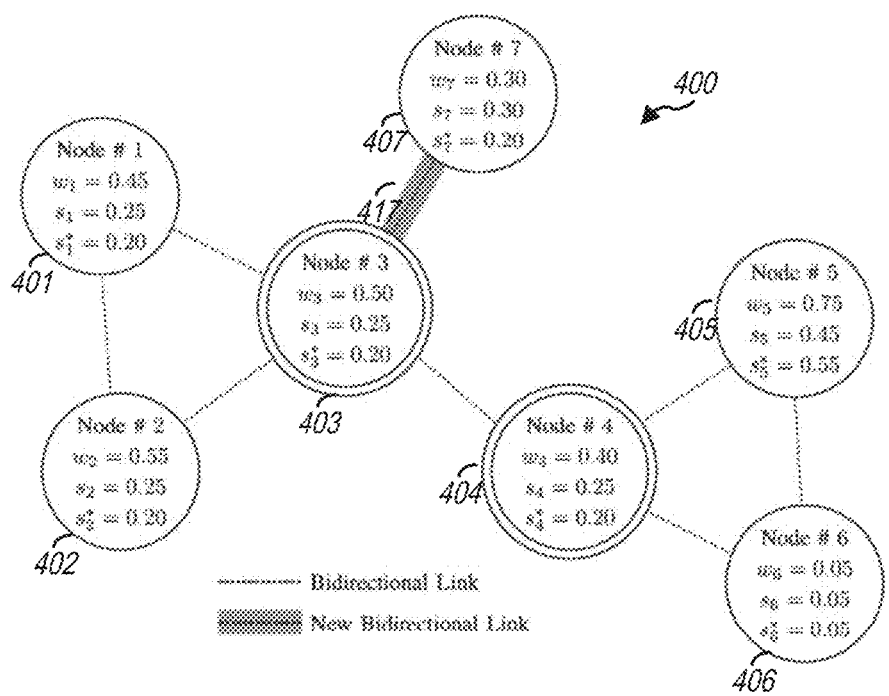
FIG. 4 is a block diagram illustrating a network along with TLA allocations computed after adding a link in the network according to one embodiment of the disclosure.

One example of the operation of the TLA protocol described above adapting to a change in network conditions is described with reference to FIG. 4. FIG. 4 is a block diagram illustrating a network along with TLA allocations computed after adding a link in the network according to one embodiment of the disclosure. A network 400 may include nodes 401-407. Node 407 may begin disconnected from other nodes and then move into range of node 403, such that a new network link 417 may be formed. Node 403 may begin offering 0.25, which is claimed by the bidders of nodes 401, 402, 403, and 404. With the claims of node 403 and 404 limited by the offer of node 403 and the claim of node 406 limited by its demand, the auctioneer at node 404 may be free to offer 0.45, which is claimed by node 405. Upon detecting node 407 as a neighbor, the auctioneer at node 403 may decrease its offer to 0.20. The bidders at nodes 401, 402, 403, 404, and 407 may respond by reducing their claims accordingly. The smaller claims of the bidders at nodes 403 and 404 may allow the auctioneer at node 404 to increase its offer to 0.55. The bidder at node 405 may respond by increasing its claim to 0.55.

Nodes of a network implementing the TLA protocol described above may be configurable in how the protocol are implemented. For example, network nodes may be configured to implement lazy or eager persistences, physical layer or MAC layer receivers, and/or weighted or non-weighted bidding. Further, the nodes may be configured, in certain embodiments, to include a minimum persistence, a default persistence, and/or a lost neighbor time. These settings may be located in configuration files stored on the nodes and may be accessed by the network protocol stack on the node.

In one embodiment, nodes may be configured with lazy or eager persistences. When configured with a lazy persistence, a persistence for a node i, $p_i$, may be set equal to the claim of bidder i. After convergence is achieved in a network, the $p_i$ may equal the TLA allocation interpreted as persistence. When configured with an eager persistence, persistence may be set as a minimum of offers from the network nodes. In an eager persistence configuration, the persistence may be more responsive to sudden increases in demand.

In one embodiment, nodes may be configured with physical layer or MAC layer receivers. In a wireless network, receivers may be defined in terms of physical layer or MAC layer communication. At the physical layer, every node may be a receiver. At the MAC layer, packets may be filtered by destination address, and a node may only be considered a receiver if one of its neighbors has MAC packets destined to it. MAC layer receivers may increase channel allocation by over-allocating at non-receiving nodes. However, the over allocation may slow detection of new receivers. Physical receivers may prevent overallocation at the receivers, which may allow the allocation to be more responsive to changes in traffic where nodes become receivers.

In one embodiment, nodes may be configured with weighted or non-weighted bidders. When a node services more than one traffic flow, the node may be configured with a weighted TLA allocation. The demands of weighted bidders may include one or more demand fragments, and the number of fragments accumulated into a demand is the demand's weight. In a weighted allocation, each bidder may inform adjacent auctions of its weight.

In one embodiment, a minimum persistence may be configured on a node. A persistence of zero may be maintained by some nodes without impacting the communication requirements of its bidder. For auctioneers, if a receiver becomes overwhelmed by neighboring transmitters, a non-zero persistence may be used to quiet the neighbors. Thus, the node may be configured with a minimum persistence, $p_{min}$, such as by creating dummy packets, whenever the sum of claims from adjacent bidders exceeds the auction capacity.

In one embodiment, a default persistence, $p_{default}$, may be configured on a node. With a default persistence, there may be two conditions where a node constrains its persistence to be no larger than $p_{default}$. One condition is when a node has no neighbors. While TLA allocation permits an isolated node to consume 100 percent of a channel, it cannot discover new neighbors if it does so. The second condition is where several nodes operating with large persistences join a network at about the same time. When the persistences are large enough, neighbor discovery may be difficult. Thus, the nodes may be limited to a default persistence to facilitate efficient neighbor discovery.

In one embodiment, a lost neighbor time, $t_{lostNbr}$, may be configured on a node. The lost neighbor time may establish an amount of time after which a node determines a neighbor has disconnected if no message is received during the time. After a timer on the node reaches $t_{lostNbr}$, the node may inform its auctioneer and bidder accordingly.

Figure 5:
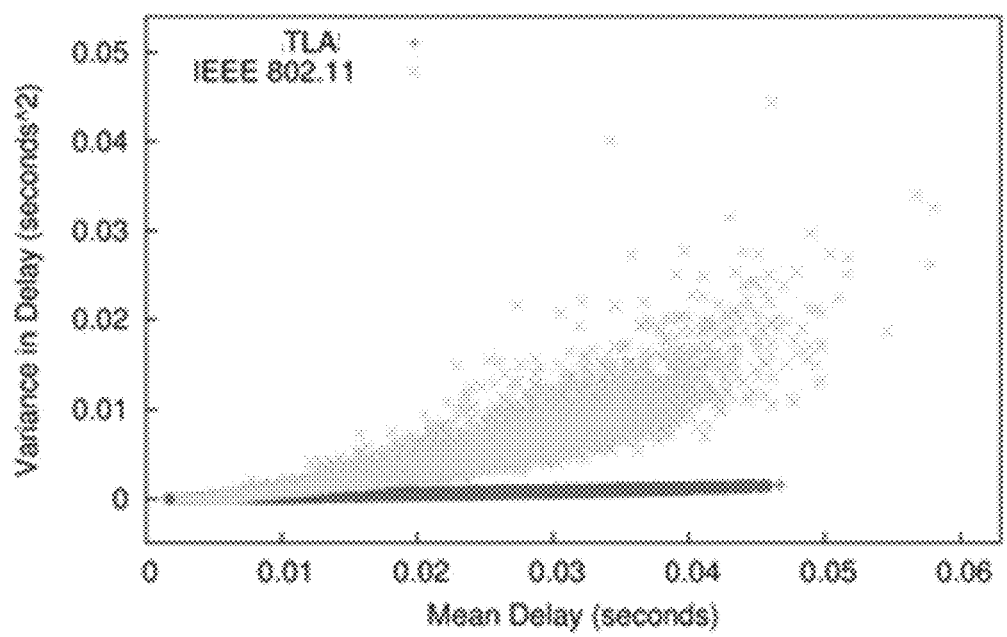
FIG. 5 is a graph illustrating the improved performance of one implementation of the TLA protocol compared with conventional IEEE 802.11 protocols according to one embodiment of the disclosure.

The TLA protocol described above may provide improved performance during network data transfer, such as during TCP transfers. FIG. 5 is a graph illustrating the improved performance of one implementation of the TLA protocol compared with conventional IEEE 802.11 protocols according to one embodiment of the disclosure. In particular, the graph of FIG. 5 illustrates packet delay for a network with node speeds of approximately 30 meters per second, in which the IEEE 802.11 nodes are configured with a maximum packet retry count of seven for RTS, CTS, and ACKs and four for data packets, a mini-slot length of 20 microseconds, and minimum and maximum contention window sizes of 32 and 1024 slots, respectively. Each point in the scatter plot of FIG. 5 reports an average packet delay on the x-axis versus variation in packet delay on the y-axis for a single node. The largest reported variation in delay for TLA is 0.047 seconds for TLA and 0.058 seconds for IEEE 802.11. The largest reported variation in delay for TLA is 0.0016 seconds$^2$, which is only 3.6 percent of the 0.0444 seconds$^2$ reported for IEEE 802.11. Thus, the TLA protocol may provide a significant reduction in delay variance, which improves TCP data transfer rates, particularly when the nodes are moving.

In one embodiment, the TLA protocol described above may be implemented in a cross-layer solution in which the MAC layer may communicate with higher level protocols. For example, a transport layer may inform the MAC layer of its traffic demands, and the MAC layer may inform the transport layer of network availability. This may allow the transport layer to decide between, for example, not admitting the data flow, rerouting the data flow, and/or compressing data in the data flow.

Although the TLA protocol described above refer to the computation of persistences for nodes in a network, the TLA protocol may be adapted for calculation of other values, such as determining network congestion and discovering alternate routes around the congestion. For example, one network configuration may have physical receiver configurations with demands set to one. A resulting allocation may be independent of actions taken by the upper network layers and can inform decisions made by those layers. The resulting allocation can serve as a measure of potential network congestion. For example, small allocations may be assigned in dense networks containing many potentially active neighbors. A routing protocol in the network can use the allocation values to discover alternate routes around congestion.

One application in congested networks for the TLA protocol is the implementation of differentiated service at the MAC layer. For example, a distributed coordination function may implement four access categories with an instance of the back-off algorithm run per access category, and each category may have its own queue. For example, the categories may include voice traffic, video traffic, web traffic, etc. Such queues may be implemented similar to the operation of IEEE 802.11e. The probability of transmission of each access category may prioritized by manipulating selection of contention window size and inter-frame space. This permits higher priority traffic to capture the channel from lower priority traffic.

Although the above TLA protocol are described with respect to schedule-based protocols, the TLA protocol may also be implemented in contention-based protocols, such as the IEEE 802.11 standard. When implemented with contention-based schemes, the TLA protocol may be adapted to assign contention window size rather than assign allocations from the persistence values. For example, the contention window size may be fixed to a size based, at least in part, on the topology (e.g., neighbor locations) and load (e.g., how much of the channel those neighbors seek to utilize). Such a contention-based scheme with a contention window size based on these parameters is another example of a TLA protocol. When a node's allocation changes, the node's contention window size may adapt. Conventionally in IEEE 802.11, the contention window size is only changed based on a binary exponential backoff algorithm that does not take into consideration topology or load.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, solid state storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although wireless networks are described above, a TLA protocol as described above may be implemented in a wired network. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   identifying a set of network resources;
   identifying a set of demands;
   assigning resources of the set of network resources to demands of the set of demands, wherein the step of assigning comprises incrementally assigning network resources to the demands based, at least in part, on a desired persistence of each demand of the set of demands,
   in which the step of assigning resources comprises assigning resources based, at least in part, on a topology of the set of demands and a load for each demand of the set of demands;
   executing a bidder algorithm to generate a claim on each demand of the set of demands; and
   executing an auctioneer algorithm to generate an offer on each demand of the set of demands.

2. The method of claim 1, in which the step of assigning elements comprises:
   creating a set of nodes from the set of demands;
   creating a set of active nodes from the set of demands;
   incrementally increasing a capacity of the set of network resources assigned to nodes of the set of active nodes;
   removing from the set of active nodes each demand when at least one of the following conditions occurs:
   a demand reaches a desired persistence; and
   a demand is bottlenecked by a lack of available resources in the set of network resources.

3. The method of claim 1, in which the set of network resources comprise slots in a multiplexing scheme, and in which the set of demands comprise a set of transmitters transmitting according to the multiplexing scheme.

4. The method of claim 3, in which the desired persistence of each transmitter of the set of transmitters is a fraction of the time slots that each transmitter is permitted to transmit.

5. The method of claim 3, in which the multiplexing scheme is a time division multiplexing (TDM) scheme.

6. The method of claim 1, in which the set of network resources comprise contention windows, and in which the set of demands comprise a set of transmitters transmitting according to a contention-based scheme.

7. The method of claim 6, in which a size of the contention windows is based, at least in part, on a topology of the set of network resources and a load on the set of network resources.

8. The method of claim 1, in which the claim and the offer are inserted into a header of a network transmission, in which the network transmission includes a data payload.

9. The method of claim 8, in which the claim and the offer are inserted into a MAC-layer header of the network transmission.

10. The method of claim 1, further comprising at least one of:
    updating the claim based on a demand, which may be based on a traffic load at each demand;
    updating the claim based on a demand, which may be based on a topology of the set of demands;
    updating the offer based on a demand, which may be based on the traffic load at each demand; and
    updating the offer based on a demand, which may be based on the topology of the set of demands.

11. A computer program product, comprising:
    a non-transitory computer-readable medium comprising code to execute the steps of:
    identifying a set of network resources;
    identifying a set of demands;
    assigning resources of the set of network resources to demands of the set of demands, wherein the step of assigning comprises incrementally assigning network resources to the demands based, at least in part, on a desired persistence of each demand of the set of demands,
in which the step of assigning resources comprises assigning resources based, at least in part, on a topology of the set of demands and a load for each demand of the set of demands;
executing a bidder algorithm to generate a claim on each demand of the set of demands; and
executing an auctioneer algorithm to generate an offer on each demand of the set of demands.

12. The computer program product of claim 11, in which the medium further comprises code to execute the steps of:
creating a set of nodes from the set of demands;
creating a set of active nodes from the set of demands;
incrementally increasing a capacity of the set of network resources assigned to nodes of the set of active nodes;
removing from the set of active nodes each demand when at least one of the following conditions occurs:
a demand reaches a desired persistence; and
a demand is bottlenecked by a lack of available resources in the set of network resources.

13. The computer program product of claim 12, in which the set of network resources comprise time slots in a multiplexing scheme, and in which the set of demands comprise a set of transmitters transmitting according to the multiplexing scheme, and in which the desired persistence of each demand of the set of demands is a fraction of the time slots that each demand is permitted to transmit.

14. The computer program product of claim 13, in which the multiplexing scheme is a time division multiplexing (TDM) scheme.

15. The computer program product of claim 12, in which the set of network resources comprise a contention window, and in which the set of demands comprise a set of transmitters transmitting according to a contention-based scheme, and in which a size of the contention window is based, at least in part, on a topology of the set of network resources and a load on the set of network resources.

16. The computer program product of claim 11, in which the medium further comprises code to execute the steps of:
at least one of:
updating the claim based on a traffic load;
updating the offer based on the traffic load;
updating the claim based on a topology of the set of demands; and
updating the offer based on the topology of the set of demands.

17. The computer program product of claim 11, in which the medium further comprises transmitting a claim generated by the bidder algorithm and an offer generated by the auctioneer algorithm.

18. The computer program product of claim 17, in which the medium further comprises transmitting the claim and the offer in a header of a network transmission.

19. The computer program product of claim 18, in which the claim and the offer are transmitted in a MAC-layer header of the network transmission.

20. An apparatus, comprising:
a memory; and
a processor coupled to the memory, in which the processor is configured to execute the steps of:
identifying a set of network resources;
identifying a set of demands;
assigning resources of the set of network resources to demands of the set of demands, wherein the step of assigning comprises incrementally assigning network resources to the demands based, at least in part, on a desired persistence of each demand of the set of demands,
in which the step of assigning resources comprises assigning resources based, at least in part, on a topology of the set of demands and a load for each demand of the set of demands;
executing a bidder algorithm to generate a claim on each demand of the set of demands; and
executing an auctioneer algorithm to generate an offer on each demand of the set of demands.

21. The apparatus of claim 20, in which the processor is further configured to:
create a set of nodes from the set of demands;
create a set of active nodes from the set of demands;
incrementally increase a capacity of the set of network resources assigned to nodes of the set of active nodes;
remove from the set of active nodes each demand when at least one of the following conditions occurs:
a demand reaches a desired persistence; and
a demand is bottlenecked by a lack of available resources in the set of network resources.

22. The apparatus of claim 20, in which the set of network resources comprise time slots in a time division multiplexing (TDM) scheme, and in which the set of demands comprise a set of transmitters transmitting according to the time division multiplexing (TDM) scheme, and in which the desired persistence of each transmitter of the set of transmitters is a fraction of the time slots that each transmitter is permitted to transmit.

23. The apparatus of claim 20, in which the set of network resources comprise a contention window, and in which the set of demands comprise a set of transmitters transmitting according to a contention-based scheme, and in which a size of the contention window is based, at least in part, on a topology of the set of network resources and a load on the set of network resources.

24. The apparatus of claim 20, in which the processor is further configured to execute the steps of:
transmitting the claim and the offer in a MAC-layer header of a network transmission.

* * * * *